Nov. 8, 1927. 1,648,032
A. O. STARKIN
EXPANDING TOOL
Filed Aug. 19, 1925
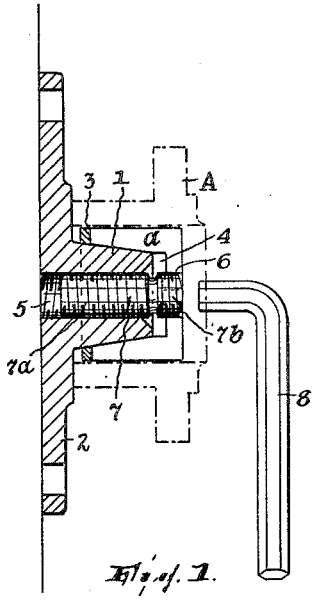
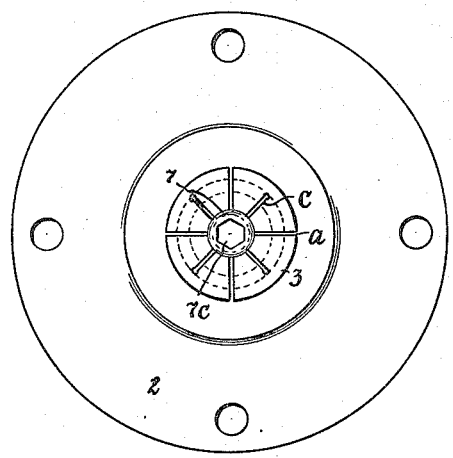
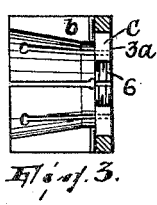
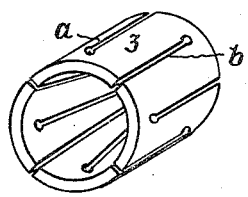
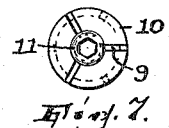
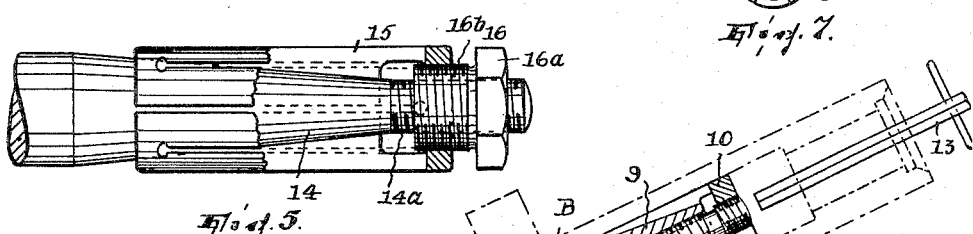
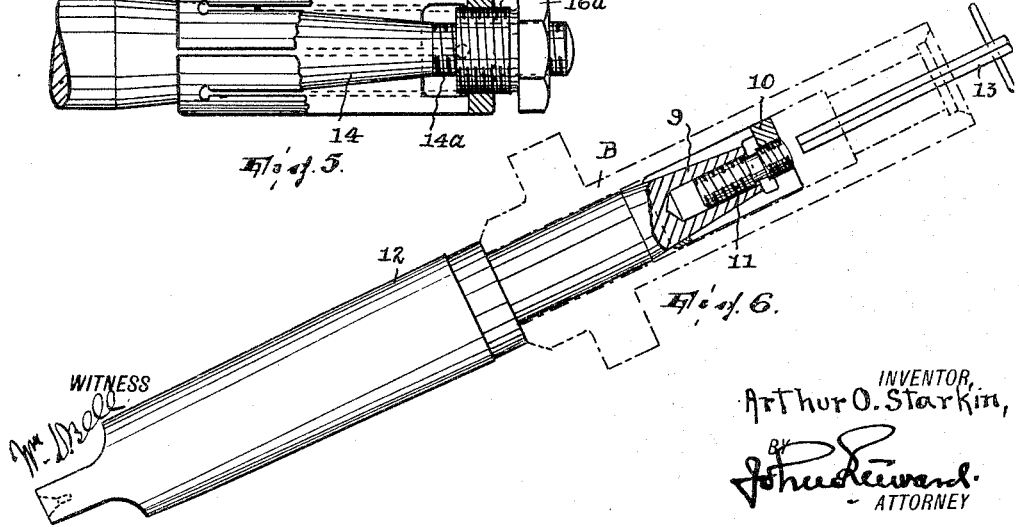
INVENTOR,
Arthur O. Starkin,
ATTORNEY Patented Nov. 8, 1927.

1,648,032

UNITED STATES PATENT OFFICE.

ARTHUR O. STARKIN, OF PATERSON, NEW JERSEY, ASSIGNOR OF ONE-THIRD TO GUY W. VAUGHAN, OF RIDGEWOOD, NEW JERSEY.

EXPANDING TOOL.

Application filed August 19, 1925. Serial No. 51,195.

This invention consists in a novel tool, useful for example as a means for holding work which is to be turned on an axis and in some way operated upon, as in a lathe or drill press, comprising a radially deformable member, a deforming member therefor concentric with the deformable member, one member being movable relatively to the other lengthwise of their axis of concentricity and said members having coacting wedge means to cause deforming of the first member by the second member on such movement and said members having screw threads of like hand of which the thread of one member is of different pitch from that of the other, and an operating member revoluble with respect to the first two members and having screw threads of different pitch engaged with their respective threads. It is known to use an operating member connected by threads of different hand with the other two members. But comparative tests under actual working conditions of a device of that character and my own show the following: that whereas by my device a given degree of frictional resistance between the deformable member and the work is attainable (or once attained is capable of being disestablished) by the use of a simple hand implement, such as a wrench, it is not so by the known device, which invariably requires resort to a more powerful hand implement and usually the application of a hammer, with the further consequence that the abuse the device thus receives materially shortens its life.

In the examples shown by the drawing the deformable member is of the expansible as distinct from the contractible type.

In said drawings,

Fig. 1 shows the invention as applied to a face plate of a lathe, the view being principally in section lengthwise of the axis of rotation and a wrench for turning the operating member appearing in side elevation;

Fig. 2 is a front elevation of what is shown in Fig. 1, with the wrench removed;

Fig. 3 shows the deformable member in longitudinal section;

Fig. 4 is a rear perspective view of such member;

Fig. 5 is a side elevation, partly in section, showing the invention applied to a lathe spindle and in a modified form;

Fig. 6 shows the invention in side elevation, partly in section, in a form following that of Figs. 1 to 4, but for application to a drill press; and Fig. 7 is an end elevation of the device of Fig. 6.

In the construction of Figs. 1 to 4 the deforming member is a mandrel in the form of a stub 1 on the face plate 2. The deformable member is a sleeve 3 which has splits extending lengthwise thereof and in two sets alternating with each other and respectively reaching from the ends of the sleeve toward but not to the opposite ends, so that the member may be expanded equally throughout its entire length; this member snugly fits the member 1 and may be shifted longitudinally of their common axis as they are shown assembled in Fig. 1, and for effecting by wedge-action a deforming (here, expansion) of member 3 member 1 is in the present case externally conical and member 3 internally conical. (The two sets of splits mentioned are designated $a$ and $b$ in Figs. 1, 3 and 4.) Member 3, at the end remote from the face plate, has an end wall $3^a$. It may be remarked that on initial assemblage a space 4 is left between the end of member 1 and the wall $3^a$ of member 3. Further that the splits $a$ are extended into wall $3^a$ and clear to the central hole thereof to be mentioned, and that alternating with such radial extensions are other splits $c$ extending from such hole to the inner perimeter of the sleeve, so that uniform expansion of the entire member is possible.

The member 1 and the wall $3^a$ of member 3 have alined axial holes 5 and 6, and these are threaded at a different pitch from each other, preferably so that the pitch of the hole 5 is greater than that of the hole 6.

The operating member is here a screw 7 having threads of like hand but of different pitch, to wit, the thread $7^a$ matching and engaged with the thread of hole 5, and the thread $7^b$ matching and engaged with the thread of hole 6. The member 7 may have an endwise polygonal socket $7^c$ to receive the conforming end of a suitable wrench 8. Since the working threading is that having the greater pitch the other threading may in the present example be taken as affording the swivel.

Let A represent a piece of work of cylindrical or equivalent form fitted over the member 3 in Fig. 1. When the member 7 is turned in the proper direction it will feed into the member 1 and, since the pitch of its thread at 7$^b$ is less than that of its thread at 7$^a$, member 3 will be shifted lengthwise of the common axis of the members, and this will expand member 3 and cause it to grip the work. Reverse turning of member 7 will obviously cause release of the work; this release, as already remarked, is effected forcibly and with great celerity and ease.

In Figs. 6 and 7 the parts 9, 10 and 11 are in all essential respects the same as the parts 1, 3 and 7 excepting that in this case the deforming part 9 is an extension of the shank 12 to be fitted into the chuck of a drill press or the like. The work and the wrench are here respectively indicated by the characters B and 13.

In Fig. 5, 14 is the deforming member, 15 the deformable member and 16 the operating member. The construction does not differ materially from those already described excepting that member 16 receives instead of its being received by member 14, for this purpose being constructed thus: It is tubular and has a faceted head 16$^a$ to receive a wrench for turning it; and exteriorly it has a thread 16$^b$ of one pitch matching and engaged with the thread of hole of member 15 and interiorly it has a thread of another pitch (steeper) matching and engaged with the thread 14$^a$ in this case formed externally on member 14. Fig. 5 also shows that member 14 may be a lathe spindle.

Having thus fully described my invention what I claim and desire to secure by Letters Patent is:

A radially deformable tool including a radially deformable member, a deforming member concentric with the deformable member, one member being movable relatively to the other lengthwise of their axis of concentricity and said members having coacting wedge means to cause deforming of the first member by the second member on such movement and said members having screw threads of like hand of which the thread of one member is of different pitch from that of the other, and an operating member revoluble with respect to the first two members and having screw threads of different pitch engaged with their respective threads.

In testimony whereof I affix my signature.

ARTHUR O. STARKIN.